United States Patent [19]
Barry et al.

[11] Patent Number: 4,711,334
[45] Date of Patent: Dec. 8, 1987

[54] TELESCOPIC CHUTE FOR MIXER DISCHARGE

[76] Inventors: Joseph A. Barry, 701 SW. 35th Ave., Boyton Beach, Fla. 33435; Leo J. Barry, 225 W. Maple Ave., Bound Brook, N.J. 08805

[21] Appl. No.: 901,425

[22] Filed: Aug. 28, 1986

[51] Int. Cl.$^4$ .................................. B65G 11/14
[52] U.S. Cl. .................................. 193/6; 193/10; 193/17; 403/378
[58] Field of Search ........... 193/4, 6, 10, 16–19, 193/25 C, 30; 212/267, 269; 366/68; 403/378, 379

[56] References Cited

U.S. PATENT DOCUMENTS

| | | |
|---|---|---|
| 180,769 | 8/1876 | Iske . |
| 606,520 | 6/1898 | Darrah . |
| 1,174,858 | 3/1916 | Hamilton ............ 403/378 X |
| 1,190,417 | 7/1916 | Jacobs . |
| 1,364,581 | 1/1921 | Ramsey ............ 193/6 |
| 1,401,837 | 12/1921 | Vogt ............ 193/6 X |
| 1,946,222 | 2/1934 | Mandt ............ 193/10 |
| 2,772,764 | 12/1956 | McClellan . |
| 2,968,382 | 1/1961 | Oury . |
| 3,157,262 | 11/1964 | Chapdelaine ............ 193/10 |
| 3,168,946 | 2/1965 | Gay . |
| 3,303,948 | 2/1967 | Peruski ............ 193/6 |
| 3,456,769 | 7/1969 | Prichard et al. . |
| 3,465,899 | 9/1969 | Reuter et al. ............ 212/267 |
| 3,498,435 | 3/1970 | Tellefson . |
| 3,738,450 | 6/1973 | Hessler et al. ............ 193/6 X |
| 3,774,741 | 11/1973 | Johnson ............ 193/6 X |
| 3,923,175 | 12/1975 | Landvatter . |
| 3,930,567 | 1/1976 | Sims . |
| 4,007,821 | 2/1977 | Schiffelbein . |

FOREIGN PATENT DOCUMENTS

| | | | |
|---|---|---|---|
| 69094 | 5/1949 | Denmark ............ 403/379 |
| 684937 | 7/1930 | France ............ 193/6 |

OTHER PUBLICATIONS

Sketch of 381,748 France; Sep. 12, 1907.

*Primary Examiner*—Jeffrey V. Nase
*Attorney, Agent, or Firm*—Marshall & Melhorn

[57] ABSTRACT

A telescoping extension chute has a first semicircular section with an inlet end for pivotal connection to a main chute on a mixer truck and a pair of tubular tracks attached along upper longitudinal edges. An intermediate section with a semicircular cross-section of larger radius telescopes over the first section and has a pair of tubular tracks attached along upper longitudinal edges which extend through slots formed in the bottom walls of the first section tracks. A third section with a semicircular cross-section of still larger radius telescopes over the intermediate section and has a pair of bars attached along upper longitudinal edges which extend through slots formed in the bottom walls of the intermediate section tracks. Rollers attached to the tracks cooperate to provide relative telescoping movement and a locking mechanism prevents relative movement in any extended position.

26 Claims, 7 Drawing Figures

TELESCOPIC CHUTE FOR MIXER DISCHARGE

BACKGROUND OF THE INVENTION

In general, the invention relates to a discharge chute for a concrete mixer vehicle and, in particular, to a telescopic extension chute for such discharge apparatus.

Typically, concrete mixer vehicles have a discharge chute mounted beneath the discharge opening of the mixer for directing the concrete or other mix material from the vehicle to the desired deposit point. One end of the chute is pivotally mounted at the opening of the mixer for pivoting about a vertical axis for swinging from side to side, and for pivoting about a horizontal axis for changing the angle of inclination of the chute to achieve the appropriate elevation of the discharge end.

In most conventional concrete mixer trucks, a section of the discharge chute is permanently mounted with its upper end at the mixer outlet and its lower end supported by an extendable element such as a hydraulic piston and cylinder for varying the angle of inclination. A second shorter section of chute is pivotally mounted on the extending first end to fold over on top of the first section for storage. In the folded condition, the chutes are in sufficiently compact relationship for both on and off highway operation of the vehicle. Normally, the vehicle carries one or more additional sections of discharge chute which may be hooked onto the extending end of the second chute to provide the desired length. Due to the extreme weight of the concrete handled and the rough conditions of use, these chutes must be of necessarily heavy construction.

Furthermore, it is not uncommon for the position of discharge to change during the pouring of a load of concrete such that the length of the discharge chute must be varied. This requires the operator to manually add and remove the discharge chutes that are carried on the vehicle with the associated delay and substantial effort required. Moreover, the plurality of chute sections can not be left assembled in their extended condition during transit since they would extend beyond practical and legal limits. Thus, the sections must be removed from the permanently attached chute and mounted at some other location on the vehicle.

SUMMARY OF THE INVENTION

The present invention involves a telescoping extension chute which can be utilized to replace the shorter second permanent chute section and removable sections of the prior art discharge chutes. At least two semi-circular sections of different diameter are utilized with one end of the first or smaller diameter section adapted to be pivotally attached to the extending end of the first permanent chute section on the mixer truck. If an intermediate telescoping section is utilized, it is slightly larger in diameter than the first telescoping section and is fitted over the outside thereof. The discharge end or last telescoping section is the largest in diameter. The first telescoping section and any intermediate sections have generally rectangular tubes attached along both upper edges and the outer or last section has rectangular steel bars welded along the upper edges thereof. The tubes are open along the bottom and function as tracks or rails for the intermediate tubes or the bars. Thus, the tubes of the first section telescope over the tubes of any intermediate sections and over the bars of the last extension section.

Rollers are attached to the ends of the telescoping sections away from the pivotal connection to the main chute to engage the rails or bars and support the next outermost section. Furthermore, locking mechanisms are provided to hold the chute sections in the fully telescoped position. Also, a support brace and springs tend to maintain the telescoped and folded chutes in their stored position during travel.

It is an object of the present invention to provide a telescoping discharge chute extension for a concrete mixing truck which is permanently attached to the truck and easy to extend and store.

BRIEF DESCRIPTION OF THE DRAWINGS

The above as well as other objects of the invention will become apparent to one skilled in the art from reading the following detailed description of a preferred embodiment of the invention when considered in light of the attached drawings in which.

DESCRIPTION OF THE PREFERRED EMBODIMENT

Figure 1:
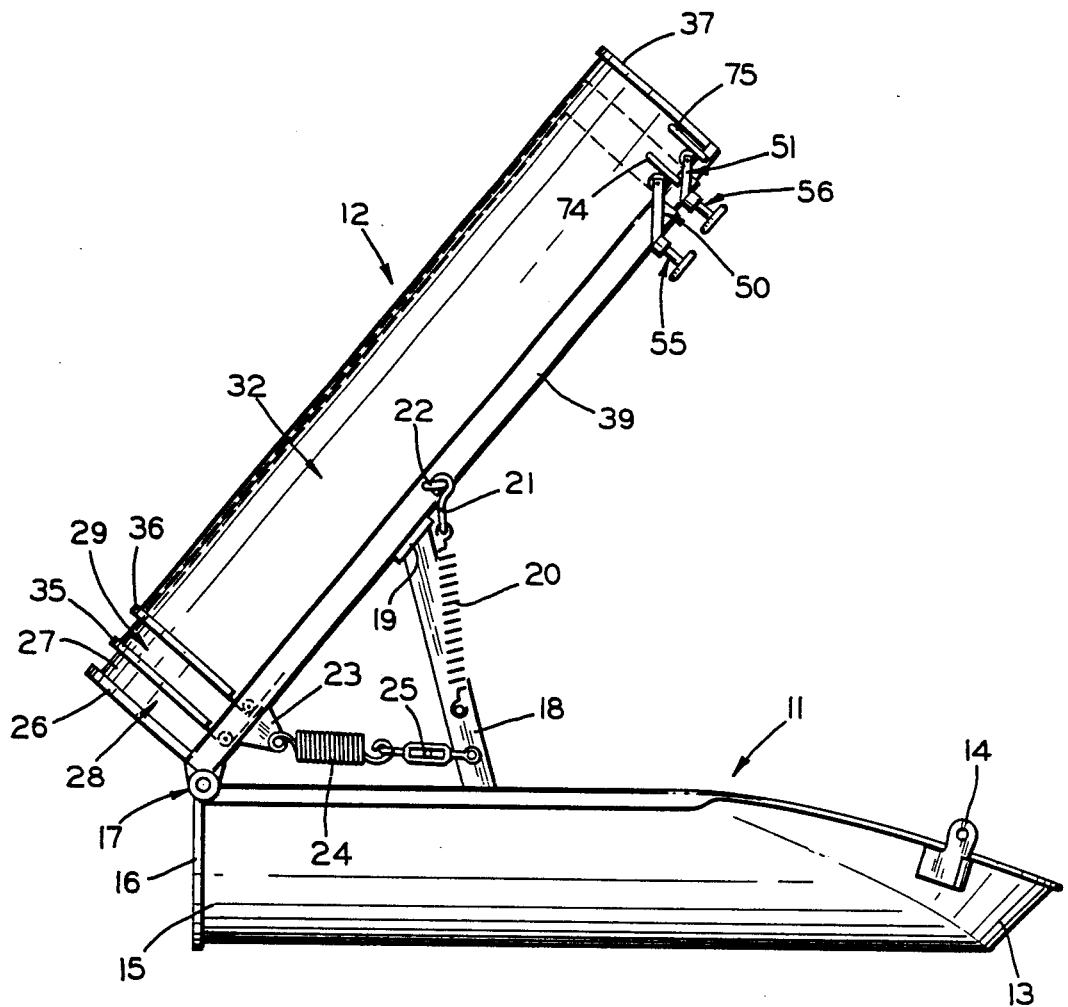
FIG. 1 is a side elevational view of a discharge chute and a telescoping extension chute in accordance with the present invention.

There is shown in FIG. 1 a conventional main chute 11 which is typically semi-circular in cross-section. The main chute 11 has a closed inlet end 13 which can be connected to a mixing vehicle by a bracket 14 attached to the main chute 11. Opposite the closed inlet end 13 is an open outlet end 15 of the main chute. The bracket 14 cooperates with a conventional mechanism on the mixing vehicle to allow the outlet end 15 to rotate about a vertical axis located at the inlet end 13 and also permit vertical positioning of the outlet end 15.

The outlet end 15 of the main chute 11 has a flange 16 formed about its peripheral edge. As will be discussed below, the flange 16 cooperates with an abutting end of the telescopic extension chute assembly 12. A pivot mechanism 17 is connected between the upper edge of the outlet end 15 and the upper edge of the abutting end of the telescopic extension chute assembly 12. The pivot mechanism 17 can be of any conventional type such as a shaft and sleeve bearing. Extending generally vertically upwardly from the side of the main chute 11 is a support arm 18 having a support pad 19 attached to an upper end thereof. A supporting surface of the support pad 19 is angled between horizontal and vertical to engage an upper edge of the telescopic extension chute assembly in the folded position as shown in FIG. 1. An helical hold down spring 20 has one end attached to the support arm 18 adjacent the main chute 11. The other end of the spring 20 is connected to a locking hook 21 which releasably engages an eye 22 attached to the telescopic extension chute assembly 12. When the assembly 12 has been folded into engagement with the support pad 19, the hook 21 is engaged with the eye 22 to prevent the assembly 12 from jumping off the support pad 19 and falling over center when the mixing vehicle goes over a bump.

A mounting bracket 23 is attached to an upper edge of the chute assembly 12 near the pivot mechanism 17. One end of a helical spring 24 is pivotally attached to the bracket 23. The other end of the helical spring 24 is attached to one end of a turnbuckle 25 having its other end attached to the support arm 18. The helical spring 24 is a tension spring which aids in lowering and raising the chute assembly 12 about the pivot mechanism 17. The turnbuckle 25 can be utilized to adjust the tension of the spring 24. Although only one side of the main chute 11 and chute assembly 12 have been shown in FIG. 1, the bracket 14 and the elements 17 through 25 can be duplicated along the opposite edges of the main chute 11 and chute assembly 12.

Figure 2:
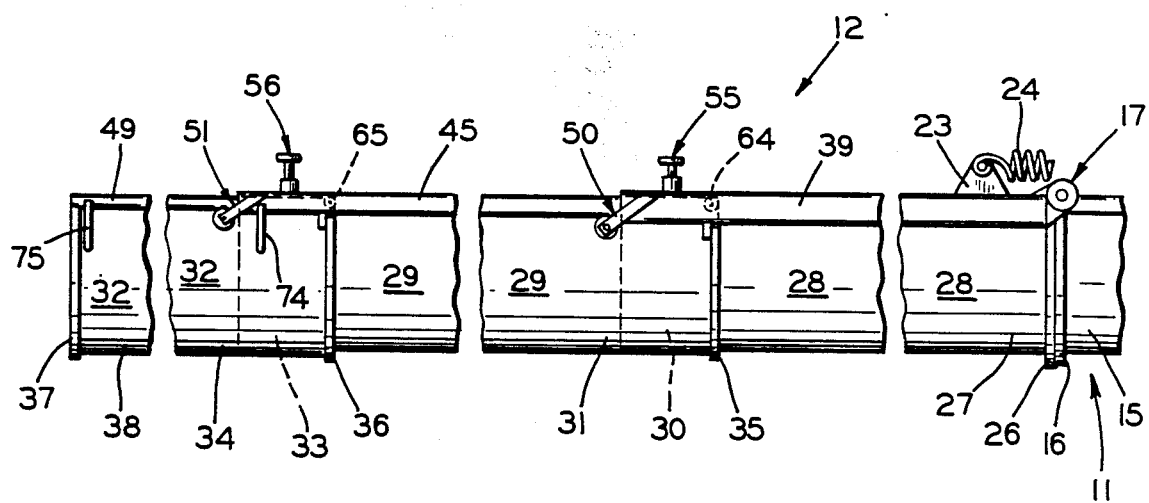
FIG. 2 is a fragmentary side elevational view of the telescoping chute of FIG. 1 shown in the extended position.

In FIG. 2, the telescopic extension chute assembly 12 is shown in the lowered and extended position. The chute assembly 12 has been lowered by pivoting about the pivot mechanism 17 in a counterclockwise direction until a flange 26, formed at the peripheral edge of an inlet end 27 of a first chute extension section 28, abuts the flange 16. Typically, the chute assembly 12 is lowered into position with all of the extension chutes telescoped together as shown in FIG. 1. During the lowering of the chute assembly 12, the helical spring 24 will be extended as shown in FIG. 2 thereby assuming some of the load or weight of the chute assembly 12 as it is being lowered into position. When the flange 26 abuts the flange 16, the chute assembly 12 can be extended to its full length or any intermediate position.

A second or intermediate extension chute or section 29 is slightly larger in diameter than the first extension section 28. Thus, an outlet end 30 of the section 28 extends inside an inlet end 31 of the section 29. This configuration tends to prevent the material being discharged from the mixer vehicle from flowing between the extension chutes 28 and 29 without the necessity for a seal. Similarly, a third or discharge extension section 32 has a slightly larger diameter than the section 29. Thus, an outlet end 33 of the chute 29 extends inside an inlet end 34 of the extension chute 32. The section 29 can have a flange 35 formed about the peripheral edge of its inlet end 31 and the section 32 can have a flange 36 formed about the peripheral edge of its inlet end 33 and a flange 37 formed about the peripheral edge of an outlet end 38.

Figure 3:
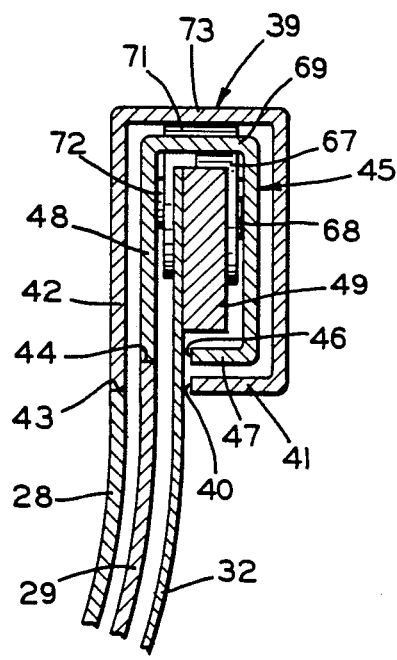
FIG. 3 is a fragmentary enlarged view taken as if in cross-section through the telescoping chutes of FIG. 1 to show the supporting rail.

As best shown in FIG. 3, the extension chute sections 28, 29 and 32 are of different diameters to enable them to nest or telescope together in the stored position shown in FIG. 1. FIG. 3 is an enlarged fragmentary view taken as if in cross-section to show the nesting of the tracks or rails of the chute assembly 12. The first extension section 28 has a generally tubular track 39 attached to an upper edge thereof. The track 39 has a slot 40 formed along the entire length of a bottom wall 41. The slot 40 is formed adjacent an inner side wall 42 such that the bottom edge of the side wall 42 abuts and is attached to an upper edge 43 of the section 28.

The second or intermediate extension section 29 extends about the outside of the section 28 and an upper edge 44 of the section 29 extends upwardly through the slot 40. A track 45 of generally rectangular tubular cross-section is attached to the chute 29 and is enclosed by the track 39. The track 45 has a slot 46 formed in a bottom wall 47 thereof which slot 46 extends along the entire length of the track 45. The slot 46 is formed adjacent an inner side wall 48 of the track 45 and a lower end of the side wall 48 abuts and is attached to the upper edge 44 of the section 29. The upper edge of the third or discharge extension section 32 extends through the slots 40 and 46. A strip of bar stock 49 of generally rectangular cross-section is attached to an outer surface of the upper edge of the section 32. The bar stock 49 is surrounded by the track 45 which in turn is surrounded by the track 39.

Typically, the chute sections 28 and 29 are formed of a twelve gage steel material and the chute section 32 is formed of a lighter fourteen gage steel material. The track 39 can be a length of $1\frac{1}{2}'' \times 2\frac{1}{2}'' \times \frac{1}{4}''$ steel tubing. The track 45 can be a length of $1'' \times 2'' \times \frac{1}{8}''$ thick steel tubing. The bar 49 can be a $\frac{3}{8}'' \times 1''$ bar. Each of the chute sections 28, 29 and 32 can be approximately four feet long.

Figure 4:
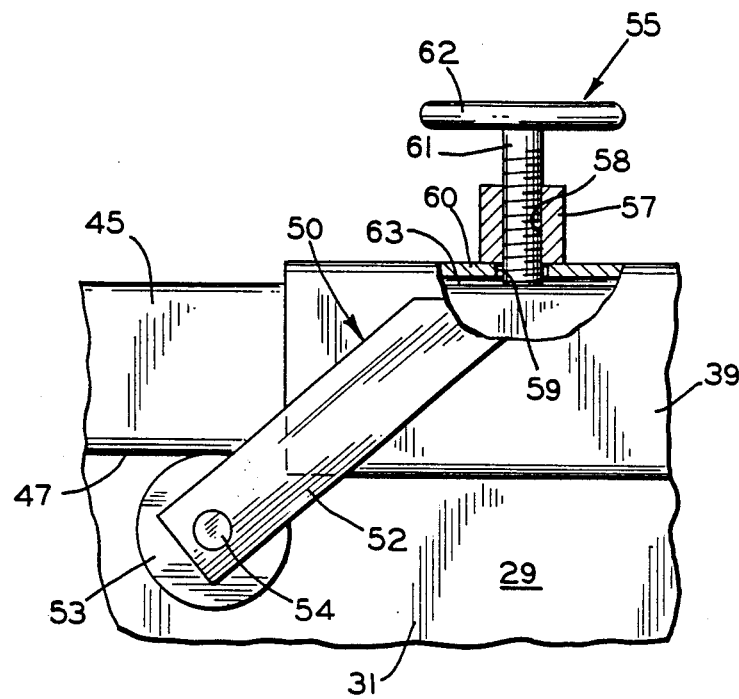
FIG. 4 is an enlarged fragmentary view showing a supporting wheel and a locking mechanism of the invention shown in FIG. 1 with the locking mechanism in cross-section.

As shown in FIGS. 1 and 2, the extension chutes 29 and 32 are supported by roller assemblies 50 and 51 respectively which are attached to the outlet ends of the extension chutes 28 and 29 respectively. The roller assembly 50 is shown in greater detail in FIG. 4 and is representative of the roller assembly 51. Typically, the roller assemblies 50 and 51 are duplicated on the opposite sides of the chutes. The roller assembly 50 includes an arm 52 having one end attached to an outwardly facing side wall of the track 39. The arm 52 is attached at the outlet end 30 and extends beyond the outlet end of the chute 28 at a downward angle. The other end of the arm 52 has a roller 53 pivotally connected thereto by a conventional fastener 54. The roller 53 engages the bottom wall 47 of the track 45 to position the track 45 centrally within the track 39. Similarly, the roller assembly 51 is attached to the track 45 to engage a lower surface of the bar 49 and support the bar 49 centrally within the track 45. If necessary, the roller 53 can be mounted on bearings (not shown) of the ball or roller type.

Also shown in FIGS. 1 and 2, are locking mechanisms 55 and 56 mounted on the extension chutes 28 and 29 respectively. The locking mechanism 55 is shown in more detail in FIG. 4 and is representative of the locking mechanism 56. Although the locking mechanisms 55 and 56 are shown as positioned on the tops of the tracks 39 and 45 respectively, they could also be mounted on the sides of such tracks and similar locking mechanisms could be provided on the opposite edges of the chutes 28 and 29.

The locking mechanism 54 includes a threaded base 57 which is attached to an upper surface of the track 39 by any conventional means such as by welding. The base 57 includes a threaded aperture 58 extending therethrough and oriented with its longitudinal axis in a generally vertical direction centered over an aperture 59 formed in an upper wall 60 of the track 39. A threaded rod 61 has one end attached at the center of a generally disk-shaped handle 62. The other end of the rod 61 extends through the base 57 and the aperture 59. When it is desired to lock the chutes 28 and 29 in position relative to one another, the handle 62 is turned to thread the rod 61 into engagement with an upper surface 63 of the track 45 thereby trapping the track 45 between the end of the threaded rod 61 and the roller 53 to prevent relative longitudinal movement between the chutes 28 and 29. The locking mechanism 55 is released by a rotating handle 62 in the opposite direction to move the end of the threaded rod 61 out of engagement with the upper surface 63.

Figure 5:
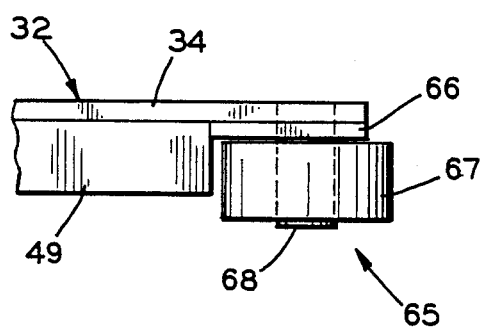
FIG. 5 is an enlarged fragmentary plan view of one of the wheels used in the invention of FIG. 1.

The inlet ends 31 and 34 of the extension sections 29 and 32 respectively are also supported on rollers. As shown in FIG. 2, a roller assembly 64 is attached to the inlet end 31 and a roller assembly 65 is attached to the inlet end 34. The roller assembly 65 is shown in more detail in FIG. 5. The bar 49 stops short of the peripheral edge of the inlet end 34 of the extension chute 32. A mounting plate 66 can be attached to the outer surface of the extension chute 32 between the end of the bar 49 and the edge of the inlet end 34. A roller 67 is pivotally mounted on a shaft 68 which extends through and is attached to the mounting plate 66 and the extension chute 32. The roller 67 is positioned to engage the inner surface of an upper wall 69 (FIG. 3) of the track 45. Thus, it can be seen that the roller assembly 51 and the roller assembly 65 cooperate with the track 45 and the bar 49 to permit relative movement between the chutes 29 and 32.

Figure 6:
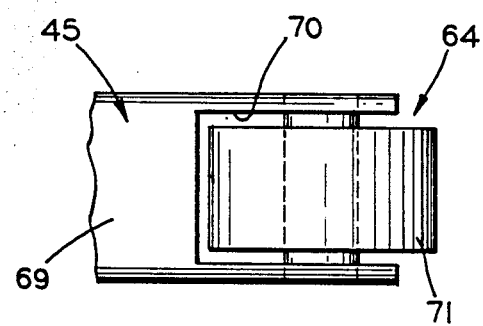
FIG. 6 is an enlarged fragmentary plan view of another type of wheel used in the invention of FIG.1.

As shown in FIG. 6, the peripheral end of the upper wall 69 of the track 45 is cut out to form a recess 70 for accepting a roller 71. The roller 71 is rotatably mounted on a shaft 72 which extends between and is retained in the side walls of the track 45. As shown in FIG. 3, the roller 71 extends above the upper wall 69 of the track 45 and engages an inner surface of an upper wall 73 of the track 39. Thus, the roller assembly 50 and the roller assembly 64 cooperate with the track 39 and the track 45 to permit the extension sections 28 and 29 to move relative to one another. Of course, the roller assemblies 64 and 65 are typically duplicated on the other side of the extension chute assembly 12.

As an aid in extending and retracting the sections 29 and 32, a downwardly extending handle 74 can be attached to the track 45 adjacent the roller assembly 51 and a downwardly extending handle 75 can be attached to the bar 49 adjacent the flange 37. The handles 74 and 75 make it easier to exert force to extend and retract the extension sections 29 and 32 respectively.

Figure 7:
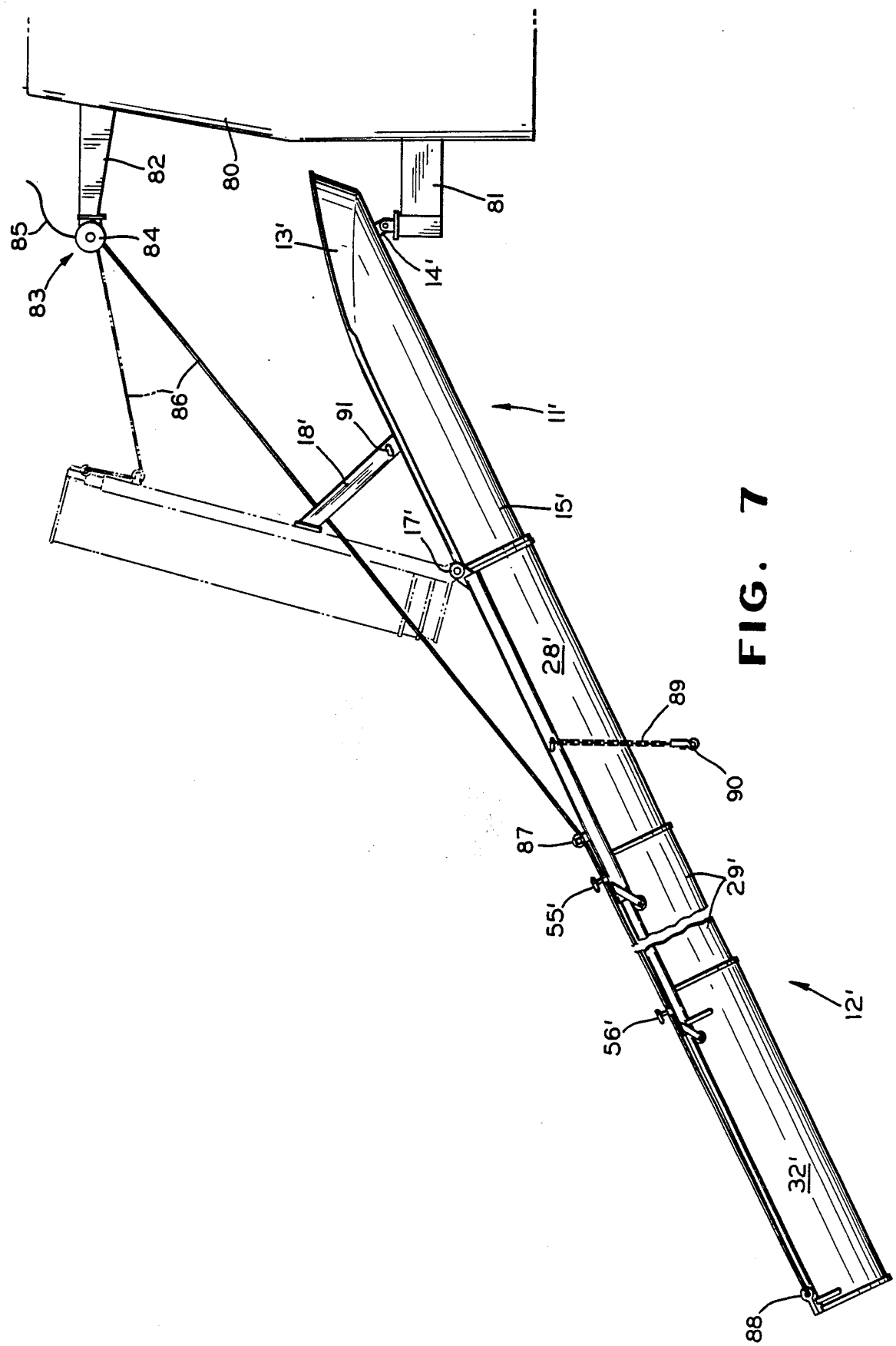
FIG. 7 is a side elevational view of a discharge chute and a telescoping extension chute in accordance with an alternate embodiment of the present invention.

There is shown in FIG. 7 an alternate embodiment of the present invention in which elements similar to those shown in FIG. 1 are labeled with the same reference numbers with a prime added thereto. A main chute 11' has a closed inlet end 13' which can be connected to a mixing vehicle 80 by a bracket 14' attached to and downwardly extending from the main chute 11'. The bracket 14' is pivotally attached to an outer end of a generally horizontally extending arm 81 affixed to the mixing vehicle 80. An outlet end 15' of the main chute 11' is attached to an abutting end of a telescopic chute assembly 12'.

Also attached to the mixing vehicle 80 is another arm 82 generally horizontally extending and spaced above the arm 81. A hoist or winch 83 is attached to an outer end of the arm 82 and includes a pulley or a drum 84 driven by an electric motor (not shown) and connected to a power source (not shown) by an electrical cable 85. The winch 83 is reversible to lower the chute assembly to the fully extended position shown in the solid lines and to raise the chute assembly to the retracted or storage position shown in phantom lines. The pulley 84 is attached to one end of a cable 86 which extends through a pulley 87 and has its other end attached to a clevis 88.

Typically, the pulley 87 is mounted along an upper edge near the discharge end of the first chute extension 28'. Typically, the clevis 88 is mounted along an upper edge near the discharge end of the third or discharge extension section 32'.

In the retracted position shown in the phantom lines in FIG. 7, a chain 89 has one end attached to the extension chute section 28'. The other end of the chain is attached to a locking hook 90 which engages an eye 91 on the support arm 18' for supporting the telescopic extension chute assembly 12'. When it is desired to lower the extension chute 12', the locking hook 90 is released from the eye 91 and approximately eight to ten inches of winch cable 86 is released by the winch 83. This action enables the main chute 11' to be lowered to an operating position as shown by the solid lines in FIG. 7. The main chute 11' is retained in its lowered position by any suitable means (not shown) such as stop means on the bracket 14'. Next, the winch 83 is run in reverse to release the winch cable 86 from the pulley or drum 84 thereby lowering the telescopic chute section assembly 12' to an approximately horizontal position. Next, the lock 55' is unlocked to release a second extension chute section (not shown). Finally, the lock 56' on the second chute extension is unlocked to release the third chute extension 32'. The telescoping extension chute according to the present invention is now in its fully extended position.

To retract the chute, the main chute 11' and extension chute 12' sections should be thoroughly cleaned. Both of the locks must be in the unlocked position and then the winch is operated to retract the cable 86. The third extension chute section 32' will retract first followed by the next chute section 29' and finally the three extension chute sections will be retracted and rotated about the pivot mechanism 17' to rest upon the support bracket 18'. The safety chain 89 and locking hook 90 are then attached to the eye 91 and the winch 83 is operated to raise the main chute 11' about the bracket 14'.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An extension chute assembly for discharging material from a storage container comprising:

a first chute section having a body of generally semicircular cross-section with a pair of generally parallel upstanding longitudinal edges extending between an inlet end and an outlet end;

first track means having a pair of generally tubular bodies, each of said tubular bodies attached to and extending along an associated one of said upstanding edges and having a downwardly facing, longitudinally extending slot formed therein;

a second chute section having a body of generally semicircular cross-section of a larger radius than said first chute section with a pair of generally parallel upstanding longitudinal edges extending between an inlet end and an outlet end; and second track means attached to and extending along an associated one of said upstanding edges of said second chute section, said second chute section upstanding edges each extending through an associated one of said first track means slots to position said second track means inside said first track means tubular bodies, said first track means including at least one roller assembly having an arm with one end attached to said first track means at said outlet end of said first chute section and a roller rotatably attached to an opposite end of said arm, said roller engaging a downwardly facing surface on said second track means, wherein said first and second track means cooperate for relative longitudinal movement between said first and second chute sections.

2. The assembly according to claim 1 wherein said second track means includes at least one roller assembly rotatably mounted thereon and engaging a downwardly facing inner surface on said first track means tubular bodies.

3. The assembly according to claim 1 wherein said first tract means includes at least one locking means having a base with a threaded aperture mounted over an aperture formed in a wall of one of said tubular bodies, a threaded shaft threadably engaged in said threaded aperture with one end attached to a handle and an opposite end extending through said aperture in said tubular body adjacent an outer surface of said second track means for preventing relative movement between said first and second sections in any relative longitudinal position of said chute sections.

4. The assembly according to claim 1 wherein said second track means is a pair of bars of generally rectangular cross-section.

5. The assembly according to claim 1 including a winch having a cable with one end coupled to said outlet end of said second chute whereby when said winch extends and retracts said cable, said second chute section is extended and retracted with respect to said first chute section.

6. The assembly according to claim 1 wherein said second track means is a pair of generally tubular bodies.

7. The assembly according to claim 6 wherein said second track means tubular bodies each have a downwardly facing, longitudinally extending slot formed therein, and including a third chute section having a body of generally semicircular cross-section of a larger radius than said second chute section with a pair of generally parallel upstanding longitudinal edges extending between an inlet end and an outlet end and third track means attached to and extending along an associated one of said upstanding edges of said third chute section, said third chute section upstanding edges each extending through an associated one of said second track means slots to position said third track means inside said second track means tubular bodies whereby said second and third track means cooperate for relative longitudinal movement between said second and third chute sections.

8. The assembly according to claim 7 including a winch having a cable with one end attached to a driven pulley and an opposite end attached to said outlet end of said third chute section whereby when said pulley is rotated in opposite directions, said second and third chute sections extend and retract with respect to said first chute section and each other.

9. A telescopic chute for discharging material from a mixer having a main chute comprising:

a first chute section having an inlet end and an outlet end with means for pivotally coupled said inlet end to an outlet end of a main chute, and first track means including a pair of generally tubular bodies attached to and extending longitudinally on opposite sides of said section, each of said bodies having a downwardly facing, longitudinally extending slot formed therein;

a second chute section telescoping over said first chute section and having a second track means including a pair of generally tubular bodies attached to and extending longitudinally on opposite sides of said second section, each of said second track means bodies being received in an associated one of said first track means bodies and having a downwardly facing, longitudinally extending slot formed therein;

wherein said first chute section has a roller assembly attached to each of said first track means tubular bodies at said outlet end, each said roller assembly including an arm having one end attached to an outer suface of an associated one of said first track means tubular bodies and a roller rotatably attached to an opposite end of said arm and engaging a downwardly facing surface of an associated one of said second track means tubular bodies; and a third chute section telescoping over said first chute section and having a third track means including a pair of bars attached to and extending longitudinally on opposite sides of said third section, each of said third track means bars being received in an associated one of said second track means tubular bodies.

10. The chute according to claim 9 wherein said second chute section has an inlet end and a outlet end and a roller assembly attached to each end of each of said second track means tubular bodies, each said roller assembly at said inlet end incuding a roller rotatably attached to an associated one of said second track means tubular bodies and engaging a downwardly facing inner surface of an associated one of said first track means tubular bodies, each said roller assembly ast said outlet end including an arm having one end attached to an outer surface of an associated one of said second track means tubular bodies and a roller rotatably attched to an opposite end of said arm and engaging a downwardly facing surface of an associated one of said third track means bars; and wherein said third chute section has an inlet end and an outlet end and a roller assembly attached to each of said third track means bars at said inlet end, each said roller assembly including a roller rotatably attached to an associated one of said third track means bars and engaging a downwardly facing inner surface of an associated one of said second track means tubular bodies.

11. The chute according to claim 9 wherein said first and second chute sections each include locking means mounted on said first and second track means respectively, each of said locking means including a base having a threaded aperture formed therein and a threaded shaft engaging said threaded aperture mounted over an aperture formed in one of said first and second track means for engaging a surface of said second and third track means respectively.

12. The chute according to claim 9 wherein said first chute section includes a tension spring having one end attached to said first chute section and an opposite end for connection with a main chute.

13. The chute according to claim 9 wherein said first chute section includes means for releasably attaching said first chute section to a main chute.

14. The chute according to claim 9 wherein said third chute section is attached to one end of a cable having an opposite end attached to a hoist whereby when said hoist is operated to extend and retract said cable, said second and third chute sections extend and retract respectively with respect to said first chute section and each other.

15. A telescopic extension chute assembly for a material mixer comprising:

a first chute section having a body of generally semi-circularly cross-section with an inlet end including means for coupling to a material mixer discharge opening;

first track means including a pair of tubular bodies of generally rectangular cross-section, each of said tubular bodies being attached to and extending along an associated upper edge of said first chute section body, each of said tubular bodies having a longitudinally extending slot formed in a bottom wall thereof;

a second chute section having a body of generally semicircular cross-section of a larger radius than said first section and a pair of upper edges extending through associated ones of said slots in said first track means;

a second track means including a pair of tubular bodies of generally rectangular cross-section, each of said second track means tubular bodies being attached to and exending along an associated one of said upper edges of said second chute section body and having a longitudinally extending slot formed in a bottom wall thereof;

wherein said first track means includes a pair of rollers rotatably attached at an end opposite said inlet end and engaging a downwardly facing outer surface of said bottom all of said second track means bodies;

a third chute section having a body of generally semi-circular cross-section of a larger radius than said second section and a pair of upper edges extending through associated ones of said slots in said second track means; and a third track means including a pair of bars of generally rectangular cross-section, each attached to and extending along an associated one of said upper edges of said third cute section body whereby said second chute telescopes over said first chute and said third chute telesocpes over said second chute and said first, second and third track means cooperate to enable relative longitudinal movement among said first, second and third chutes.

16. The assembly according to claim 15 wherein said second track means includes a first pair of rollers rotatably attached at one end and engaging an outer surface of a bottom wall of said third track means, and a second pair of rollers rotatably attached at an opposite end of said second track means and engaging an inner surface of an upper wall of each of said first track means tubular bodies.

17. The assembly according to claim 15 wherein said third track means includes a pair of rollers attached at one end and engaging an inner surface of an upper wall of each of said second track means tubular bodies.

18. The assembly according to claim 15 wherein said first chute section included a locking means for inhibiting relative movement between said first and second chute sections, and said second chute section includes a locking means for inhibiting relative movement between said second and third chute sections.

19. The assembly according to claim 18 wherein each of said locking means includes a base having a threaded aperture, a threaded shaft threadably engaging said threaded aperture, and a handle attached to one end of said shaft for engaging and disengaging another end of said shaft with one of said second and third track means.

20. The assembly according to claim 15 wherein said inlet end of said first chute section is pivotally attached to a main chute coupled to a material mixer discharge opening and including at least one tension spring and turnbuckle connected in series between said first chute section and said main chute.

21. The assembly according to claim 15 wherein said inlet end of said first chute is pivotally attached to a main chute coupled to a material mixer discharge opening and including at least one support arm attached at one end of said main chute and having an opposite end engaging said first track means when said first, second and third chute sections are pivoted to a storage position above said main chute.

22. The assembly accordirng to claim 15 wherein said inlet end of said first chute is pivotally attached to a main chute coupled to a material mixer discharge opening and including a flexible connector having one end coupled to one of said main chute and said first chute section and an opposite end having latching means for releasably coupling to the other one of said main chute and said first chute section.

23. The assembly according to claim 22 wherein said flexible connector is a helical spring having one end coupled to said main chute and said latching means is for releasably coupling to said first chute section.

24. The assembly according to claim 22 wherein said flexible connector is a chain having one end coupled to said first chute section and said latching means is for releasably coupling to said main chute section.

25. The assembly according to claim 15 including a winch having a cable with one end extending through a pulley attached to said first chute section and attached to said third chute section whereby when said cable is extended and retracted by said winch, said second and third chute sections extend and retract respectively with respect to said first chute section and each other.

26. The assembly according to claim 25 wherein said inlet end of said first chute section is pivotally attached to a main chute section and said first, second and third chute sections pivot about an end of said main chute section when said cable is extended and retracted by said winch.

* * * * *